United States Patent
Liang et al.

(10) Patent No.: US 9,817,252 B2
(45) Date of Patent: Nov. 14, 2017

(54) DISPLAY DEVICE AND METHOD FOR MANUFACTURING THE SAME

(71) Applicants: BEIJING BOE DISPLAY TECHNOLOGY CO., LTD., Beijing (CN); BOE TECHNOLOGY GROUP CO., LTD., Beijing (CN)

(72) Inventors: Kui Liang, Beijing (CN); Jianfeng Yuan, Beijing (CN); Seung Moo Rim, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 314 days.

(21) Appl. No.: 14/348,362

(22) PCT Filed: Jun. 17, 2013

(86) PCT No.: PCT/CN2013/077320
§ 371 (c)(1),
(2) Date: Mar. 28, 2014

(87) PCT Pub. No.: WO2014/166158
PCT Pub. Date: Oct. 16, 2014

(65) Prior Publication Data
US 2015/0146279 A1    May 28, 2015

(30) Foreign Application Priority Data

Apr. 8, 2013 (CN) .......................... 2013 1 0119495

(51) Int. Cl.
G09G 3/34 (2006.01)
G02B 26/00 (2006.01)
(Continued)

(52) U.S. Cl.
CPC ......... *G02F 1/0305* (2013.01); *G02B 26/007* (2013.01); *G02F 1/09* (2013.01);
(Continued)

(58) Field of Classification Search
CPC ............. G02F 1/167; G02F 2001/1678; G02F 2001/1676; G02F 1/172; G02F 1/133514;
(Continued)

(56) References Cited

U.S. PATENT DOCUMENTS 6,721,083 B2 * 4/2004 Jacobson .................. B41J 2/01
359/296
2010/0056361 A1 * 3/2010 Izu .......................... B01J 13/14
502/159
(Continued)

FOREIGN PATENT DOCUMENTS

CN       1490657 A       4/2004
CN       102422213 A     4/2012
(Continued)

OTHER PUBLICATIONS

International Search Report for International Application No. PCT/CN2013077320 dated Jan. 7, 2014, 11pgs.
(Continued)

*Primary Examiner* — Evelyn A Lester
(74) *Attorney, Agent, or Firm* — Ladas & Parry LLP

(57) ABSTRACT

A display device and a manufacturing method thereof are disclosed. The display device comprises an upper substrate (103), a lower substrate (104), a solvent (102), and ellipsoids (101), and the solvent (102) and the ellipsoids (101) are provided between the upper substrate (103) and the lower substrate (104). The ellipsoids are configured for forming photonic crystals and have electromagnetic characteristics. By means of photonic crystals formed by the ellipsoids having a shape of oval spheres with a size in order of
(Continued)

nanometer or sub-micrometer, the display device can change wavelength of reflected light and present different colors, thus color images can be displayed.

13 Claims, 3 Drawing Sheets

(51) Int. Cl.
| | |
|---|---|
| G02F 1/03 | (2006.01) |
| G02F 1/19 | (2006.01) |
| G02F 1/09 | (2006.01) |
| H01B 13/00 | (2006.01) |
| G02F 1/01 | (2006.01) |
| G02F 1/1335 | (2006.01) |
| G02F 1/153 | (2006.01) |
| G02F 1/00 | (2006.01) |
| G02F 1/167 | (2006.01) |
| G02F 1/1339 | (2006.01) |
| G02F 1/17 | (2006.01) |
| G02F 1/161 | (2006.01) |
| G09G 3/20 | (2006.01) |
| G02B 1/00 | (2006.01) |

(52) U.S. Cl.
CPC ........... *G02F 1/19* (2013.01); *H01B 13/0026* (2013.01); *G02B 1/005* (2013.01); *G02F 1/0063* (2013.01); *G02F 1/01* (2013.01); *G02F 1/0121* (2013.01); *G02F 1/0126* (2013.01); *G02F 1/1336* (2013.01); *G02F 1/1339* (2013.01); *G02F 1/133514* (2013.01); *G02F 1/133516* (2013.01); *G02F 1/1533* (2013.01); *G02F 1/161* (2013.01); *G02F 1/167* (2013.01); *G02F 1/172* (2013.01); *G02F 2001/094* (2013.01); *G02F 2001/133616* (2013.01); *G02F 2001/1676* (2013.01); *G02F 2001/1678* (2013.01); *G02F 2202/01* (2013.01); *G02F 2202/32* (2013.01); *G09G 3/2003* (2013.01); *G09G 3/344* (2013.01)

(58) Field of Classification Search
CPC ....... G02F 1/1339; G02F 2001/133516; G02F 1/01; G02F 1/0121; G02F 1/1533; G02F 1/0063; G02F 1/0126; G02F 1/1336; G02F 1/161; G02F 1/19; G02F 2001/133616; G02F 2202/01; G09G 3/344; G09G 3/2003
USPC .......................................... 359/296; 345/107
See application file for complete search history.

(56) References Cited

U.S. PATENT DOCUMENTS

| | | |
|---|---|---|
| 2012/0044128 A1 | 2/2012 | Joo et al. |
| 2012/0218622 A1 | 8/2012 | Bae et al. |

FOREIGN PATENT DOCUMENTS

| | | |
|---|---|---|
| CN | 102528027 A | 7/2012 |
| CN | 102650789 A | 8/2012 |
| JP | 2006-243169 A | 9/2006 |

OTHER PUBLICATIONS

First Office Action (Chinese Language) from the State Intellectual Property Office of the People's Republic of China in Patent Application No. CN201310119495.5, dated Feb. 17, 2015; 7 pages.
English translation of First Office Action from the State Intellectual Property Office of the People's Republic of China in Patent Application No. CN201310119495.5, dated Feb. 17, 2015; 7 pages.
English Abstract of CN1490657A; 1 page.
English Abstract of CN102528027A; 1 page.
International Preliminary Report on Patentability Appln. No. PCT/CN2013/077320; dated Oct. 13, 2015.
Chinese Patent Certificate Appln. No. 1871299; Dated Dec. 2, 2015.

\* cited by examiner

DISPLAY DEVICE AND METHOD FOR MANUFACTURING THE SAME

CROSS REFERENCE TO RELATED APPLICATIONS

This application is based on International Application No. PCT/CN 2013/077320 filed on Jun. 17, 2013, which claims priority to Chinese National Application No. 201310119495.5 filed on Apr. 8, 2013. The entire contents of each and every foregoing application are incorporated herein by reference.

TECHNICAL FIELD

Embodiments of the present invention relate to a technical field of display device, and more particularly relate to a display device and a method for manufacturing the same.

BACKGROUND

With development of electronic paper display technology, display devices based on electronic paper technology advance in the direction of bright colors, ultra thinness and energy saving.

A display device of electronic paper type generally comprises an upper substrate (such as a silica gel film or glass substrate) and a lower substrate (such as a silica gel film or glass substrate), and a liquid crystal layer or a microsphere layer; the upper substrate comprises common electrodes, while the lower substrate comprises thin film transistors (TFTs), pixel electrodes and a reflective layer; and the pixel electrodes generate variable electric field between the upper substrate and the lower substrate according to the signals received by the TFTs, and liquid crystals of the liquid crystal layer or microspheres of the microsphere layer are changed by the change of the electric field, such that the display device displays images.

Most of electronic paper technologies in the current technologies are based on white and black ink microspheres, and such electronic paper display device utilizes a transparent film similar to a piece of common paper, and charged microspheres with a size of about 100 microns and in an amount up to millions are distributed within the film. The microspheres have a shape of round sphere, and an end of one microsphere is coated with positively charged black coating, and the other end of the microsphere is coated with negatively charged white coating. The microspheres are sealed in a transparent silica gel film filled with lubricant oil. Circuits similar to thin film transistors in a liquid crystal display are configured on one surface of the silica film, and can apply a positive voltage or a negative voltage at various positions according to actual requirements. These charged microspheres immersed in the lubricant oil will rotate under the effect of an electric field. White portions or black portions are selectively turned out, and texts or images needed to be displayed can be formed in a macro-scale. However, such electric paper display device can only display black and white images and cannot achieve color display.

There has been provided an electric paper color display device in the current technologies. However, such display device is based on positively or negatively charged color ink microspheres with a shape of round sphere, and color ink microspheres need to be coated with coating of various colors. As images are displayed only with colors that the color ink microspheres have by themselves, there are some problems in such a display device, such as flat display colors, poor display effect, long response time, expensive price, and etc. Moreover, a color display device based on liquid crystal needs a color filter, loss of light will occur, and light transmittance will be reduced. Thus, an additional light source will be required to provide illumination and additional electric energy will be consumed. Furthermore, colors of images based on color filters are not simply structured light generated by reflection, and the color effect is poor and the contrast is low.

SUMMARY

Embodiments of the present application provide a display device, comprising an upper substrate, a lower substrate, and a solvent disposed therebetween, the display device further comprising ellipsoids configured for forming photonic crystals disposed between the upper substrate and the lower substrate and having electromagnetic characteristics.

Further, in the display device described in an embodiment of the present application, outer shells of the ellipsoids are each provided a layer of electrolyte;

Or, magnetic kernels are provided inside the ellipsoids;

Or, outer shells of the ellipsoid are each provided a layer of electrolyte and magnetic kernels are provided inside the ellipsoid.

Further, in the display device described in an embodiment of the present application, a material of the ellipsoids is an inorganic composite material or an organic composite material.

The inorganic material comprises silicon oxide, titanium oxide, or ferric oxide.

The organic material comprises polystyrene or polymethyl methacrylate.

Further, in the display device described in an embodiment of the present application, the outer shells of the ellipsoid are each provided with a polymer modification layer.

Further, in the display device described in an embodiment of the present application, the solvent comprises an organic dispersing solvent.

Further, the display device described in an embodiment of the present application further comprises a reflective layer, a light incident layer of which is subjected to roughing treatment, and the reflective layer is disposed over the lower substrate.

Further, the display device described in an embodiment of the present application also comprises supplementary light sources which are LEDs or OLEDs.

Further, in the display device described in an embodiment of the present application, the supplementary light sources are disposed evenly on a frame of the display device;

Or, the supplementary light sources are disposed evenly on the upper substrate of the display device, and a black frame is disposed inside the display device, the black frame is disposed on a position corresponding to the supplementary light sources and over the supplementary light sources.

Or, the supplementary light sources are disposed evenly on the frame of the display device, and the supplementary light sources are disposed evenly on the upper substrate of the display device, and a black frame is disposed inside the display device, the black frame is disposed on a position corresponding to the supplementary light sources and over the supplementary light sources.

An embodiment of the present application further provides a method for manufacturing a display device, comprising:

Preparing layers of transparent conductive film on an upper substrate and an lower substrate respectively, the two layers of transparent conductive film being disposed opposite to each other;

Forming a driving array on the lower substrate on which a metal layer has been formed; and Adding an emulsion of microspheres between the upper substrate and the lower substrate, and sealing the display device; the emulsion of microspheres comprising ellipsoids and a solvent, the ellipsoids being configured for photonic crystal and having electromagnetic characteristics.

Further, in the method for manufacturing the display device according to an embodiment of the present application, a method for preparing the ellipsoids comprising:

Preparing the ellipsoids with silicon oxide, titanium oxide, ferric oxide, polystyrene or polymethyl methacrylate; and Coating one end of the ellipsoids by positively or negatively charged electrolyte and forming an electrolyte layer; or coating one end of the ellipsoid by positively charged electrolyte and coating the other end of the ellipsoid by negatively charged electrolyte, and forming the ellipsoids with outer shells each coated with an electrolyte layer.

Further, in the method for manufacturing the display device according to an embodiment of the present application, the method for manufacturing the ellipsoid comprises:

Coating an outer shell material of the ellipsoids on an outer surface of a magnetic substance to form the ellipsoids with an inner magnetic kernel, the outer shell material comprising silicon oxide, titanium oxide, ferric oxide, polystyrene or polymethyl methacrylate.

In the method for manufacturing the display device according to an embodiment of the present application, after preparing of the ellipsoids, the method further comprises: modifying the outer shells of the ellipsoids with polymer, and forming the ellipsoids with an polymer modification layer disposed on the outer shells, a material used for the polymer modification layer comprises decyl trimethylammonium bromide, polyvinyl pyrrolidone, or nonyl trimethylammonium bromide.

REFERENCE NUMBERS

101: ellipsoid; 102: solvent; 103: upper substrate; 104: lower substrate; 105: supplementary light source; 106: black frame; 107: frame of a display device.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention. The followings are merely exemplary embodiments of the invention, but are not used to limit the protection scope of the invention.

Figure 1:
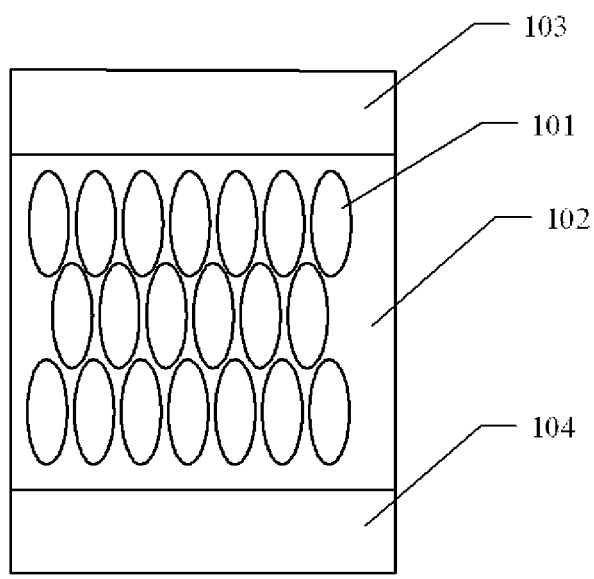
FIG. 1 is a schematic structural diagram according to an embodiment of the present application.

FIG. 1 is a schematic structural diagram according to an embodiment of the present application. As illustrated in FIG. 1, an embodiment of the present application provides a display device which comprises an upper substrate 103, an lower substrate 104 and solvent 102 disposed between the two substrates, the display device also comprises ellipsoids 101 disposed between the upper substrate 103 and the lower substrate 104, and the ellipsoids 101 are used for forming photonic crystals and having electromagnetic characteristic.

The ellipsoids 101 are micro ellipsoids in order of nanometer or sub-micrometer, and have a cross-section of an elliptical shape in which the axis of the ellipsoid is located. The wavelength of the light reflected by the photonic crystals varies as intensify of an external electric or magnetic field applied between the upper substrate 103 and the lower substrate 104 varies. The solvent 102 serves to lubricate the ellipsoids 101 and to protect the photonic crystals.

The ellipsoids 101 in order of nanometer or sub-micrometer work as a reflection matrix, and can be assembled into photonic crystals in different structures as external electric or magnetic field applied between the upper substrate 103 and the lower substrate 104 varies. A photonic crystal is in a regular optical structure made of media which have different refractive indexes and are arranged periodically, and the photonic crystal has a photon band gap and is capable of blocking photons of specific frequencies. As its structure varies, the photonic crystal reflect light of different wavelength, and thus different colors will be presented when the photonic crystal reflect external light. Under control of a driving array, different voltages are supplied to various positions according to actual requirements, the ellipsoids 101 in order of nanometer or sub-micrometer are controlled by the applied voltages. The specific principle is as below:

$$\lambda = 2nd \sin \theta,$$

which is derived from the Bragg equation, wherein $\lambda$ is the wavelength of the light reflected by the photonic crystal, n is the refractive index of the ellipsoid, d is a lattice distance, $\theta$ is a deflection angle of the ellipsoid, the lattice distance determined by an aspect ratio (a ratio of the major axis to the minor axis of the ellipsoid); the deflection angle of the ellipsoid refers to a deflection angle of the axis direction of the ellipsoid, specifically referring to an angle between the axis direction of the ellipsoid and the incident light. Given that the refractive index of the ellipsoid is constant, the wavelength of the light reflected by the photonic crystal and the lattice distance is relevant to the deflection angle of the ellipsoid. When a different electric field is applied, the angle of the axis direction of the ellipsoid in the photonic crystal with respect to incident light continuously changes, and therefore, the wavelength of the reflected light becomes different, different colors can be presented under the effect of different electric or magnetic fields, and further color images can be displayed. The particle size, the aspect ratio, the refractive index of the ellipsoid should match the requirements for the color images to be displayed.

Figure 2:
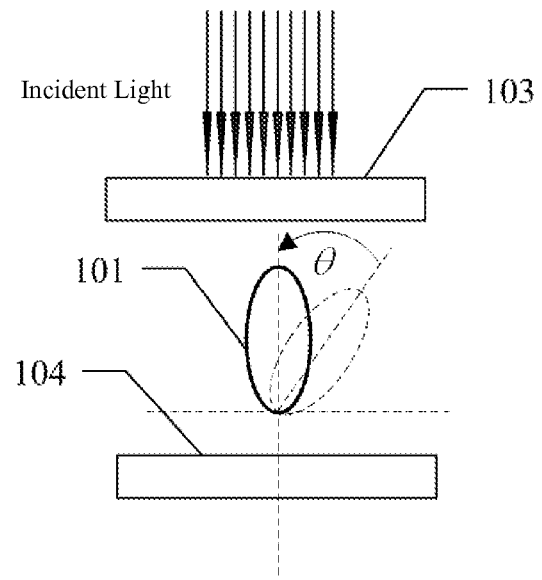
FIG. 2 is a schematic principle diagram of an ellipsoid according to an embodiment of the present application in case where the intensity of the external electric field is increased.
Figure 3:
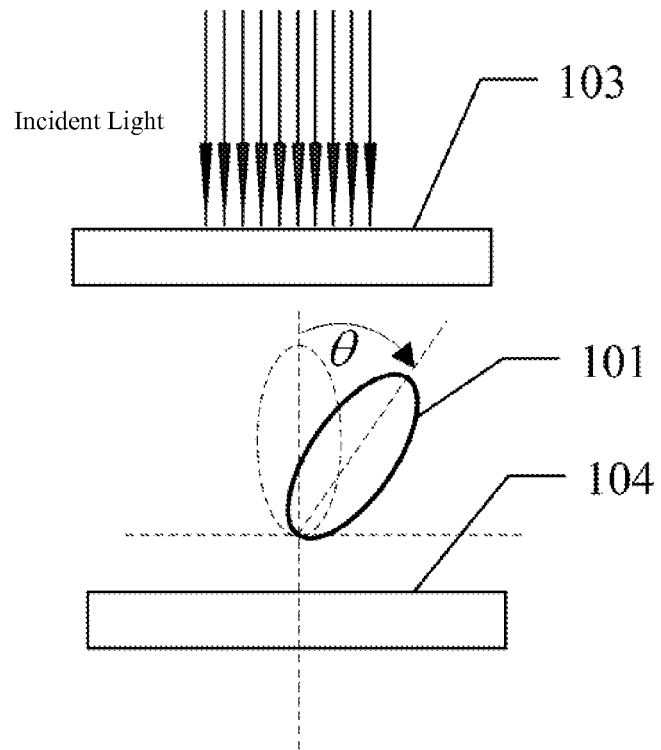
FIG. 3 is a schematic principle diagram of an ellipsoid according to an embodiment of the present application in case where the intensity of the external electric field is decreased.

As the ellipsoids have electromagnetic characteristics, the ellipsoids will be deflected if an external electric or magnetic field is applied between the upper substrate and the lower substrate. According to the aforesaid Bragger equation, if an external electric field is applied, the deflection angle of an ellipsoid will change as the intensify of the externally applied electric field changes in the situation that the refractive index n of the ellipsoid and the lattice distance d are constant. FIG. 2 is a schematic principle diagram of an ellipsoid according to an embodiment of the present application in case where the intensity of the external electric field is increased. As illustrated in FIG. 2, assuming that incoming light is perpendicularly incident on a plane on which the upper substrate 103 is located, in the situation where the voltage of the externally applied electric field is increased, the ellipsoid 101 deflects toward the direction of the incoming light, the deflection angle θ of the ellipsoid is decreased, and the wavelength λ of the light reflected by the photonic crystal is decreased. FIG. 3 is a schematic principle diagram of an ellipsoid according to an embodiment of the present application in case where the intensity of the external electric field is decreased. As illustrated in FIG. 3, in the situation where the voltage of the externally applied electric field is decreased, the ellipsoid 101 will deflect toward an opposite direction, the deflection angle θ of the ellipsoid will increase and the wavelength λ of the light reflected by the photonic crystal will increase.

It can also be derived on the same reason that, if an magnetic field is applied externally, in the situation where the intensity of the externally applied magnetic field is increased, the ellipsoid will deflect toward the direction of the incoming light, the deflection angle θ of the ellipsoid will decrease and the wavelength λ of the light reflected by the photonic crystal is decreased; in the situation where the intensity of the externally applied magnetic field is decreased, the ellipsoid 101 will deflect toward an opposite direction, the deflection angle θ of the ellipsoid will increase and the wavelength λ of the light reflected by the photonic crystal will increase.

The ellipsoid forms a photonic crystal, and the wavelength of the light reflected by the photonic crystal varies as the externally applied electric or magnetic field between the upper substrate and the lower substrate changes. Thus, the external light is reflected by the photonic crystal, and various colors can be presented.

And furthermore, the display device according to the embodiments of the present application further has the following advantages:

1. A conventional liquid crystal display device needs a color filter to present a color and the color filter will incur loss of light and decrease light transmittance. While the display device according an embodiment of the present application does not require a color filter, thus its transmittance is greater than a liquid crystal display device. And moreover, colors generated by the light reflected by photonic crystals are structured colors, thus colors displayed by the display device are more real and have a greater contrast.

2. The display device according to an embodiment of the present application displays images through external light by taking advantage of reflection of light, and it need not consume power to display images and its consumption of power is mainly for changing external electric field for the driving array. Its own supplementary light source is only used in case of insufficient external light in order to improve light intensity.

Further, in the display device according to an embodiment of the present application, an electrolyte layer is provided on the outer shell of the ellipsoid Or, a magnetic kernel is disposed inside the ellipsoid;

Or, an electrolyte layer is provided on the outer shell of the ellipsoid and a magnetic kernel is disposed inside the ellipsoid.

The outer shell of the ellipsoid is provided with an electrolyte layer, the electrolyte is positively or negatively charged electrolyte, and is coated on the surface of an ellipsoid as a coating such that the ellipsoid has electromagnetic characteristics. The ellipsoid has two ends along its axis, and the positions of the electrolyte layer can be determined in the following two manners:

An electrolyte layer is disposed on one end of the ellipsoid, and the electrolyte layer is positively or negatively charged. Positively or negatively charged electrolyte is coated on one end of the ellipsoid so as to form the electrolyte layer.

Or, an electrolyte layer is disposed at each of the two ends of the ellipsoid, a positively charged electrolyte layer is disposed at one end of the ellipsoid and a negatively charged electrolyte layer is disposed at the other end of the ellipsoid. It is possible to coat positively charged electrolyte at one end of the ellipsoid and to coat negatively charged electrolyte at the other end of the ellipsoid so as to form the electrolyte layer. If electrolyte layers differently charged each are coated at an end of the ellipsoid, respectively, the ellipsoid has a greater sensitivity to deflect.

Provision of an electrolyte layer on the outer shell of the ellipsoid can make the ellipsoid have electromagnetic characteristic, the ellipsoid deflects in the lubricant solvent under effect of the externally applied electric or varying magnetic field, such that structure of the photonic crystal changes and the wavelength of the light reflected by the photonic crystal is changed. Thus, the display device according to an embodiment of the present application can display color images.

Figure 4:
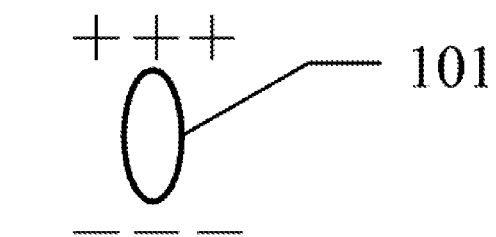
FIG. 4 is a schematic diagram of an electrolyte coated on the outer shell of the ellipsoid according to an embodiment of the present application.

FIG. 4 is a schematic diagram of an electrolyte coated on the outer shell of the ellipsoid according to an embodiment of the present application. As illustrated in FIG. 4, a negatively charged electrolyte layer is coated on one end of the ellipsoid 101, and a positively charged electrolyte layer is coated on the other end of the ellipsoid 101. As positive and negative charged electrolytes are distributed at two ends of the ellipsoid, under effect of electric fields of different intensity or varying magnetic field, the ellipsoid deflects as the electric or magnetic field varies, such that the wavelength of the light reflected by the photonic crystal is affected.

A magnetic kernel (core) is provided within the ellipsoid, and the ellipsoid is an ellipsoid having a kernel and a shell. A magnetic kernel is provided in the ellipsoid such that the ellipsoid has electromagnetic characteristics. The material for the outer shell of the ellipsoid comprises silicon oxide, titanium oxide, ferric oxide, polystyrene or polymethyl methacrylate. An ellipsoid provided with a magnetic kernel can be formed by coating the outer surface of a magnetic material with an outer shell material through the Stober method. The aspect ratio of the ellipsoid can be adjusted by adjusting the amount of the material coated onto the outer shell. The Stober method refers to a method that synthesizes nanoparticle spheres of silicon oxide with good dispersion capability by catalyzing tetraethyl orthosilicate with ammonia hydroxide such that the size of the nanoparticle spheres is controllable and the surface of the nanoparticle spheres is easy to be functionalized. The Stober method is widely used for preparing inorganic nanoparticles, and is also called Chemical coprecipitation method. If the outer shell material is an organic material, the outer shell is prepared by a method of emulsion polymerization.

The ellipsoid provided with an inner magnetic kernel can make the ellipsoid have electromagnetic characteristic. The ellipsoid deflects in the lubricant solvent under the effect of an externally applied magnetic or varying electric field, such that the structure of the photonic crystal changes and the wavelength of the light reflected by the photonic crystal is changed. Thus, the display device according to an embodiment of the present application can display color images.

Further, in the display device according to an embodiment of the present application, the material for the ellipsoid is an inorganic composite material or an organic composite material.

The inorganic composite material comprises silicon oxide, titanium oxide, or ferric oxide.

The organic composite material comprises polystyrene or polymethyl methacrylate.

In the ellipsoid, the inner magnetic kernel is an inorganic material, and the outer shell material is an organic or inorganic material.

In a case where the outer shell of the ellipsoid is provided with an electrolyte layer, the material for the ellipsoid is silicon oxide, titanium oxide, ferric oxide, polystyrene or polymethyl methacrylate. In this case, the ellipsoid is formed of any of the foregoing materials, and then the ellipsoid is coated by electrolyte. Thus, an ellipsoid with its outer shell provided with an electrolyte layer is obtained.

In a case where the ellipsoid is provided with an inner magnetic kernel, the material for the outer shell of the ellipsoid is silicon oxide, titanium oxide, ferric oxide, polystyrene or polymethyl methacrylate. The magnetic kernel is coated with any of the foregoing materials, and an ellipsoid having an inner magnetic kernel is formed.

The foregoing materials for the ellipsoid have no electromagnetic characteristics, but they can form photonic crystals. It is possible to coat an electrolyte layer on the ellipsoid made of any of the foregoing materials so as to form the ellipsoid having electromagnetic characteristics; or, it is possible to coat any of the foregoing materials on the outer surface of the magnetic material and control the size so as to form the ellipsoid having electromagnetic characteristics.

The ellipsoid having electromagnetic characteristic can deflect in the solvent under the effect of an externally applied electric or magnetic field. Thus, the wavelength of the light reflected by the photonic crystal formed of the ellipsoid is changed, and the display device according to an embodiment of the present application can display color images.

Further, in the display device according to an embodiment of the present application, the outer shell of the ellipsoid is provided with a polymer modification layer.

In order to maintain the dispersion capability of the ellipsoids and fix the positions thereof, it needs to make the ellipsoids subject to a surface treatment so as to reduce the acting forces among the ellipsoids and avoid random accumulation of the ellipsoids. The surface treatment is conducted to modify the outer shell of the ellipsoids with polymers by means of microwave ultrasonic or stirring. The material used in polymer modification comprises decyl trimethylammonium bromide, polyvinyl pyrrolidone, or nonyl trimethylammonium bromide. Finally, the ellipsoid with a polymer modification layer is formed. The material for the polymer modification layer comprises decyl trimethylammonium bromide.

Further, in the display device according to an embodiment of the present application, the solvent comprises an organic dispersing solvent.

The solvent is mainly used for lubricating and for filling the region between the upper substrate and the driving array. The solvent can facilitate the ellipsoid to rotate under the effect of an externally applied electric field, and can protect photonic crystal structure formed of the ellipsoid from being damaged. The solvent comprises an organic dispersing solvent which typically is an oil polymer organic solvent, such as an oleic acid series material. It can be referred to the dispersing solvent used in the current electronic ink technology or the current electronic paper technology.

Further, the display device according to an embodiment of the present application further comprises a reflective layer, the light incident surface of which is subjected to roughing treatment, the reflective layer being disposed over the lower substrate.

The roughing treatment to the reflective layer can enhance the effect of light diffusion, such that the brightness of displayed images is uniform and the display effect of the display device is improved.

Further, the display device according to an embodiment of the present application further comprises a supplementary light source, and the supplementary light source can be an LED or an OLED.

The amount of the supplementary light sources may be not less than two. The supplementary light sources are integrated on the upper glass substrate and adopt LED or OLED. The supplementary light sources are turned on where the external light is insufficient in order to improve brightness, such that the display device can display images even in a dark environment.

Further, in the display device according to an embodiment of the present application, the supplementary light sources are evenly distributed on a frame of the display device.

Or, the supplementary light sources are evenly distributed on the upper substrate of the display device; and a black frame is disposed inside the display device, and the black frame is disposed in a position corresponding to and over the supplementary light sources.

Or, the supplementary light sources are evenly distributed on a frame of the display device, and the supplementary light source are evenly distributed on the upper substrate of the display device; and moreover, a black frame is disposed inside the display device, and the black frame is disposed in a position corresponding to and over the supplementary light sources.

The black frame serves as a black matrix, and can be used to keep a portion of the light emitted from the supplementary light sources from being directly incident into human's eyes.

Figure 5:
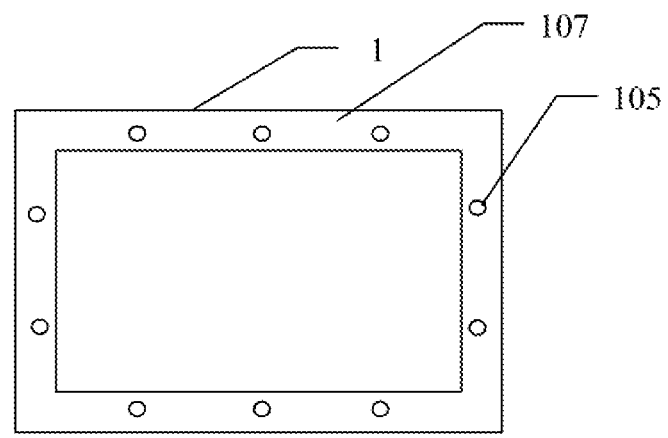
FIG. 5 is a schematic diagram of the supplementary light sources disposed on a frame of a display device according to an embodiment of the present application.

FIG. 5 is a schematic diagram of the supplementary light sources disposed on a frame of a display device according to an embodiment of the present application. As illustrated in FIG. 5, the supplementary light sources 105 are evenly distributed on a frame 107 of the display device, and this arrangement can make the supplementary light from the display device 1 distributed uniform. Moreover, the supplementary light sources can be easily arranged and are easy to be manufactured.

Figure 6:
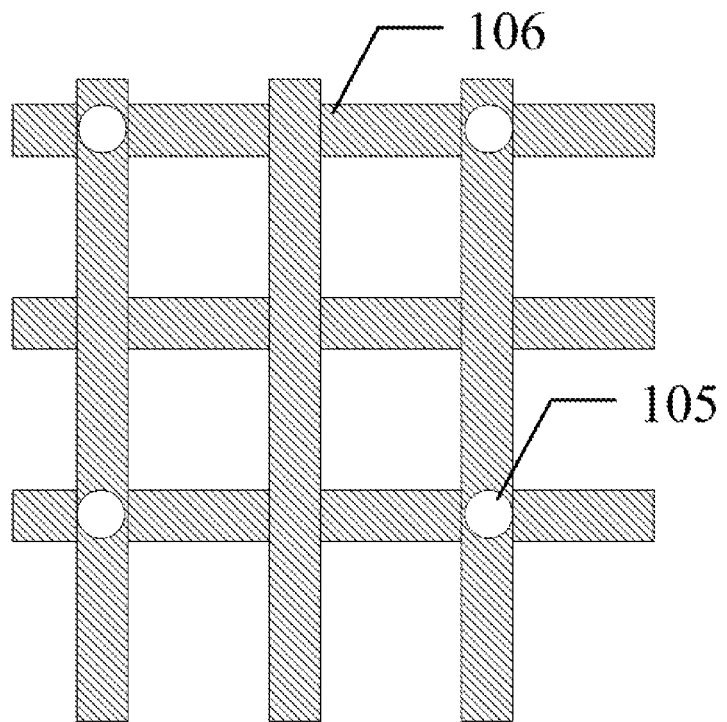
FIG. 6 is a schematic diagram of a black frame of a display device according to an embodiment of the present application.

FIG. 6 is a schematic diagram of a black frame of the display device according to an embodiment of the present application. As illustrated in FIG. 6, the black frame 106 is configured in a position corresponding to the supplementary light sources 105 and is used to block the light from the supplementary light sources from directly exiting the display device and prevent the brightness at the supplementary light sources from being obviously greater than the brightness at other regions of the display device.

An embodiment of the present application also provides a display device manufacturing method for manufacturing the display device according to an embodiment of the present application. The method according to the embodiment of the present application comprises the following steps.

Step S1, preparing transparent conductive film layers on an upper substrate and a lower substrate respectively, the transparent conductive film layers being disposed opposite to each other;

Step S2, forming a metal reflective layer on the lower substrate on which the transparent conductive film layer has been formed;

The manner for forming a metal reflective layer can be evaporation, sputtering or the like.

Step S3, preparing a driving array on the lower substrate on which the metal reflective layer is formed; patterns of the driving array being similar to thin film transistors in an array substrate of a common LCD display panel and serving as switch elements for electric fields or magnetic fields. Of course, the driving array can be of a passive driving mode as long as it can serve as switch elements for electric fields or magnetic fields, and no limitation is imposed here.

Step S4, providing microsphere emulsion between the upper substrate and the lower substrate, and sealing the display device. The microsphere emulsion comprises ellipsoids and solvent, and the ellipsoids are used for forming photonic crystals and have electromagnetic characteristics.

Further, in the method for manufacturing a display device according to the embodiment of the present application, in step S4, preparing of the ellipsoids comprises:

Step S411, preparing the ellipsoids with silicon oxide, titanium oxide, ferric oxide, polystyrene or polymethyl methacrylate;

Step S412, coating positively or negatively charged electrolyte on one end of the ellipsoid so as to form an electrolyte layer; or, coating positively charged electrolyte on one end of the ellipsoid and negatively charged electrolyte on the other end of the ellipsoid, so as to form an ellipsoid with its outer shell coated with an electrolyte layer.

Further, in the method for manufacturing the display device according to the embodiment of the present application, in step S4, preparing of the ellipsoids comprises:

Step S421, coating an outer shell material of an ellipsoid on the outer surface of a magnetic substance, the outer shell material comprising silicon oxide, titanium oxide, ferric oxide, polystyrene or polymethyl methacrylate, so as to form the ellipsoid with an inner magnetic kernel.

Further, the manufacturing the display device according to the embodiment of the present application, in step S4, after preparing the ellipsoids, may further comprise modifying the outer shell of the ellipsoid with polymer so as to form the ellipsoid with its outer shell coated with a polymer modification layer, the material used for the polymer modification layer comprises decyl trimethylammonium bromide, polyvinyl pyrrolidone, or nonyl trimethylammonium bromide.

In the method for manufacturing the display device according to the embodiment of the present application, ellipsoids having electromagnetic characteristics are manufactured, and the ellipsoids are added to a solvent so as to form a microsphere emulsion, and the display device is manufactured by utilizing the microsphere emulsion as an essential component. As the ellipsoids have electromagnetic characteristics, photonic crystals formed of the ellipsoids can change the wavelength of the light reflected by the photonic crystals as the externally applied electric field or magnetic field varies. Thus, different colors can be displayed.

In the display device and the method for manufacturing the display device according to the present application, photonic crystals formed of ellipsoids with a shape of oval sphere having a size in order of nanometer or sub-micrometer are employed, the wavelength of the reflected light is changed, the light of different colors is reflected, and color images can be displayed. Thus, technical problems, existing in the electronic paper display devices of the conventional technologies based on spherical microspheres, such as only white and black images to be displayed, flat colors in displayed color images, poor display effect, slow response, high prices, and loss of light incurred by color filters in the liquid crystal display device, can be solved. Furthermore, the display device according to an embodiment of the present application can produce the following technical effects:

1. The conventional liquid crystal display device can only display colors by means of color filters, however, the color filters will generate loss of light and reduce light transmittance. While the display device according to the embodiment of the present application does not needs any color filters, and the light transmittance is greater than that in the liquid crystal device. Moreover, colors generated by the light reflected by the photonic crystal are structured colors, and the displayed colors are more real and of higher contrast.

2. The display device according to the embodiment of the present application displays images by means of reflected light of external light and needs not to consume its own power to display images. The consumed power by the display device is mainly used for changing the externally applied electric field of the driving array.

3. The display device according to the embodiment of the present application uses its own supplementary light source in case of insufficient external light so as to improve light intensity. Thus, the display device can also be used in a dark environment, and its application scenes are broadened.

4. The display device according to the embodiment of the present application adopts a black frame against the supplementary light source to block light from the supplementary light source from exiting the display device directly, so as to keep the light intensity at the supplementary light source from being obviously greater than the light intensity at other regions of the display device. Thus, the effect of displayed image is improved where the supplementary light source is used.

The foregoing are merely exemplary embodiments of the invention, but are not used to limit the protection scope of the invention. Without departing the spirit and the scope of the present invention, those skilled in the art can make various variants and modifications. So, all the equivalent technical solutions fall into the protection scope of the present invention. The protection scope of the invention shall be defined by the attached claims.

The invention claimed is:

1. A display device comprising an upper substrate, a lower substrate and a solvent between the two substrates, the display device further comprising ellipsoids between the upper substrate and the lower substrate, the ellipsoids configured for forming photonic crystal and having electromagnetic characteristics, wherein outer shells of the ellipsoids are each provided with a polymer modification layer; and a material for the polymer modification layer comprises decyltrimethylammonium bromide, polyvinyl pyrrolidone, or nonyltrimethylammonium bromide;

the display device further comprising supplementary light sources, wherein the supplementary light sources are LEDs or OLEDs;

wherein:

the supplementary light sources are evenly disposed on a frame of the display device;

or, the supplementary light sources are evenly disposed on the upper substrate of the display device, and a black frame is disposed inside the display device, the black frame is disposed at a position corresponding to the supplementary light sources and over the supplementary light sources;

or, the supplementary light sources are evenly disposed on a frame of the display device, and the supplementary light sources are evenly disposed on the upper substrate of the display device, and a black frame is disposed inside the display device, the black frame is disposed at a position corresponding to the supplementary light sources and over the supplementary light sources.

2. The display device according to claim 1, wherein outer shells of the ellipsoids are each provided with an electrolyte layer;

or, magnetic kernels are provided inside the ellipsoids;

or, outer shells of the ellipsoids are each provided with an electrolyte layer and magnetic kernels are provided inside the ellipsoids.

3. The display device according to claim 2, wherein a material for the ellipsoids is an inorganic composite material or an organic composite material;

the inorganic composite material comprises silicon oxide, titanium oxide, or ferric oxide; and the organic composite material comprises polystyrene or polymethyl methacrylate.

4. The display device according to claim 2, wherein the solvent comprises an organic dispersing solvent.

5. The display device according to claim 2, further comprising a reflective layer, a light reflective surface of which is subject to roughing treatment, the reflective layer being disposed over the lower substrate.

6. The display device according to claim 1, wherein a material for the ellipsoids is an inorganic composite material or an organic composite material;

the inorganic composite material comprises silicon oxide, titanium oxide, or ferric oxide; and the organic composite material comprises polystyrene or polymethyl methacrylate.

7. The display device according to claim 6, wherein the solvent comprises an organic dispersing solvent.

8. The display device according to claim 6, further comprising a reflective layer, a light reflective surface of which is subject to roughing treatment, the reflective layer being disposed over the lower substrate.

9. The display device according to claim 1, wherein the solvent comprises an organic dispersing solvent.

10. The display device according to claim 1, further comprising a reflective layer, a light incident surface of which is subject to roughing treatment, the reflective layer being disposed over the lower substrate.

11. A method for manufacturing a display device, the method comprising:

preparing transparent conductive film layers on an upper substrate and a lower substrate, respectively, the transparent conductive film layers being disposed opposite to each other;

forming a metal reflective layer on the lower substrate on which the transparent conductive film layer has been formed;

preparing a driving array on the lower substrate on which the metal reflective layer has been formed;

adding a microsphere emulsion between the upper substrate and the lower substrate, and sealing the display device; the microsphere emulsion comprising ellipsoids and a solvent, the ellipsoids being configured for forming photonic crystal and having electromagnetic characteristics; and modifying the outer shells of the ellipsoids with polymer so as to form the ellipsoids with a polymer modification layer on the outer shells; wherein, a material for the polymer modification layer comprises decyltrimethylammonium bromide, polyvinyl pyrrolidone, or nonyltrimethylammonium bromide;

setting supplementary light sources, wherein the supplementary light sources are LEDs or OLEDs;

wherein:

the supplementary light sources are evenly disposed on a frame of the display device;

or, the supplementary light sources are evenly disposed on the upper substrate of the display device, and a black frame is disposed inside the display device, the black frame is disposed at a position corresponding to the supplementary light sources and over the supplementary light sources;

or, the supplementary light sources are evenly disposed on a frame of the display device, and the supplementary light sources are evenly disposed on the upper substrate of the display device, and a black frame is disposed inside the display device, the black frame is disposed at a position corresponding to the supplementary light sources and over the supplementary light sources.

12. The method for manufacturing a display device according to claim 11, wherein preparing of the ellipsoids comprising:

preparing ellipsoids with silicon oxide, titanium oxide, ferric oxide, polystyrene or polymethyl methacrylate;

coating positively or negatively charged electrolyte on one end of the ellipsoids so as to form an electrolyte layer; or, coating positively charged electrolyte on one end of the ellipsoids and coating negatively charged electrolyte on the other end of the ellipsoids, so as to form the ellipsoids with outer shells each coated by an electrolyte layer.

13. The method for manufacturing a display device according to claim 11, wherein preparing of the ellipsoid comprising:

coating an outer shell material of the ellipsoids on an outer surface of a magnetic substance to form the ellipsoids with an inner magnetic kernel, the outer shell material comprising silicon oxide, titanium oxide, ferric oxide, polystyrene or polymethyl methacrylate.

* * * * *